INVENTOR.
Francis Tvrzicky
BY John F. Brezina

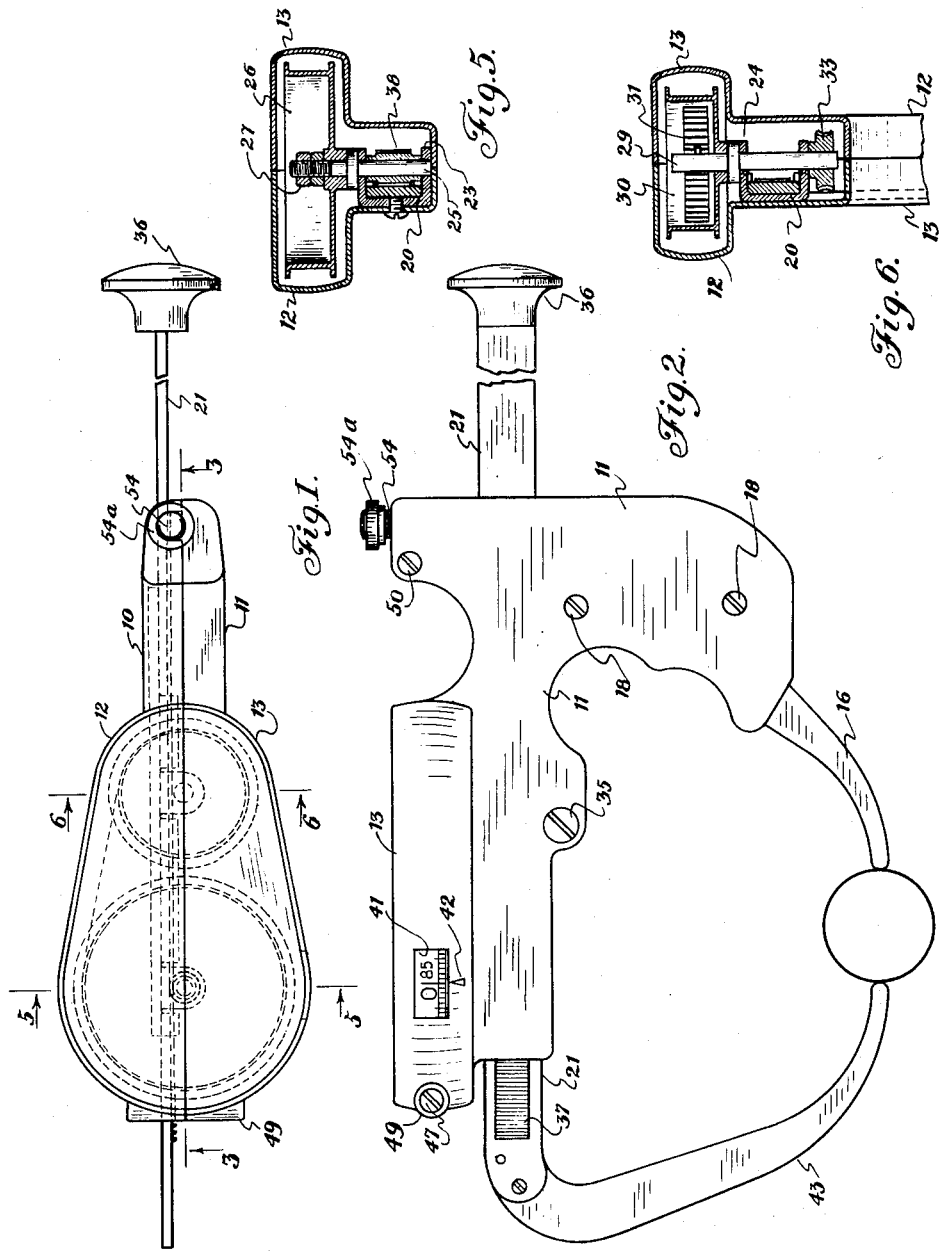
Sept. 4, 1951 — F. TVRZICKY — 2,566,685
MICROMETER CALIPERS
Filed Jan. 20, 1945 — 2 Sheets-Sheet 1
INVENTOR.
Francis Tvrzicky
BY John F. Bregina Sept. 4, 1951  F. TVRZICKY  2,566,685
MICROMETER CALIPERS
Filed Jan. 20, 1945  2 Sheets-Sheet 2

Patented Sept. 4, 1951

2,566,685

UNITED STATES PATENT OFFICE 2,566,685

MICROMETER CALIPER

Francis Tvrzicky, Chicago, Ill.

Application January 20, 1945, Serial No. 573,729

3 Claims. (Cl. 33—147)

This invention is directed to micrometer instruments or gauges adapted for use by mechanics, engineers, inspectors and other persons for quickly and easily inspecting or ascertaining the size of stock, parts or articles of various types, and which are adapted to quick and accurate measurementes, either internal or external, of parts or articles having a relatively large range of varying sizes.

It is an object of my invention to provide measuring instruments which are light in construction, relatively easy to manufacture, which are precise and which are adapted to be used for relatively large ranges of sizes.

It is a further object of my invention to provide measuring instruments or micrometers adapted to be used for quickly and precisely measuring ranges and thereby replace and make unnecessary the use of several micrometers of presently known types and constructions having different size ranges, such presently used micrometers being manufactured for limited reading, as for example, from 0" to 1", or from 1" to 2", or still other micrometers from 2" to 3".

Such presently known micrometers necessitate the purchasing and use of three or four separate instruments to fill the need for measuring articles from 0" to 3", and this necessitates not only the additional cost of such separate instruments, but also the labor time consumed in measuring various articles and parts with such separate instruments. The constructions of presently known micrometers have been such that it is impossible to construct the same for a relatively wide range of sizes and attain accurate readings. It is one object of my invention to provide a novel micrometer adapted to precisely and accurately indicate the measurements by direct reading in 0.0025 and possess the advantageous structural features of a range of sizes much greater than any presently known micrometers, and in which no feeling is necessary as is the case with presently known calipers or micrometers.

A further object of my invention is the provision of micrometers or calipers for either inside or outside measurements in a relatively wide range of sizes and which includes a manually spring-returnable depressible lever or plunger slidably mounted within a relatively light casing and which is operatively connected to rotate a pair of spaced apart drums, rotors or spools on which an indicia bearing flexible tape is movably mounted, and whereby the distance between the contacting portions of the jaws is quickly indicated to view.

Another object of my invention is the provision of micrometers having structural characteristics like above mentioned and in which one of the two rotatably mounted drums or rotors operatively connected to the manually depressible plunger is relatively smaller than the other drum, and in which the operatively connecting mechanism between the manually depressible rack bar and one of said drums includes reduction gears so as to provide for materially greater travel of the tape for any given movement of the slidable rack bar and movable jaw and whereby more precise and accurate readings of a wide range of sizes are obtainable.

A further object of my invention is the provision of micrometers or calipers having the structural features above recited and which includes two pairs of jaws, one of the two movable jaws connected to the depressible rack bar being for outside measurements and the other thereof for inside measurements, and wherein the cooperating stationary jaws are constructed for outside and inside measurements respectively to this accomplishment and structure eliminates the necessity for use of two separate micrometers in various work.

A further object of my invention is the provision of micrometer or caliper instruments having the structural features above recited and having manually operable and manually releasable locking means for locking the rack bar and connected movable jaw or jaws in any one of numerous positions to which the same are moved.

Other and further objects of my invention will be apparent from the following description and appended claims. This invention, in a preferred form, is illustrated and described in the following, with reference to numerals of reference shown in the accompanying drawings.

Referring to the drawings:

Fig. 1 is a plan view of one embodiment of my invention.

Fig. 2 is a front elevation thereof.

Fig. 5 is a cross sectional view taken on line 5—5 of Fig. 1.

Fig. 6 is a cross sectional view taken on line 6—6 of Fig. 1.

Figure 3:
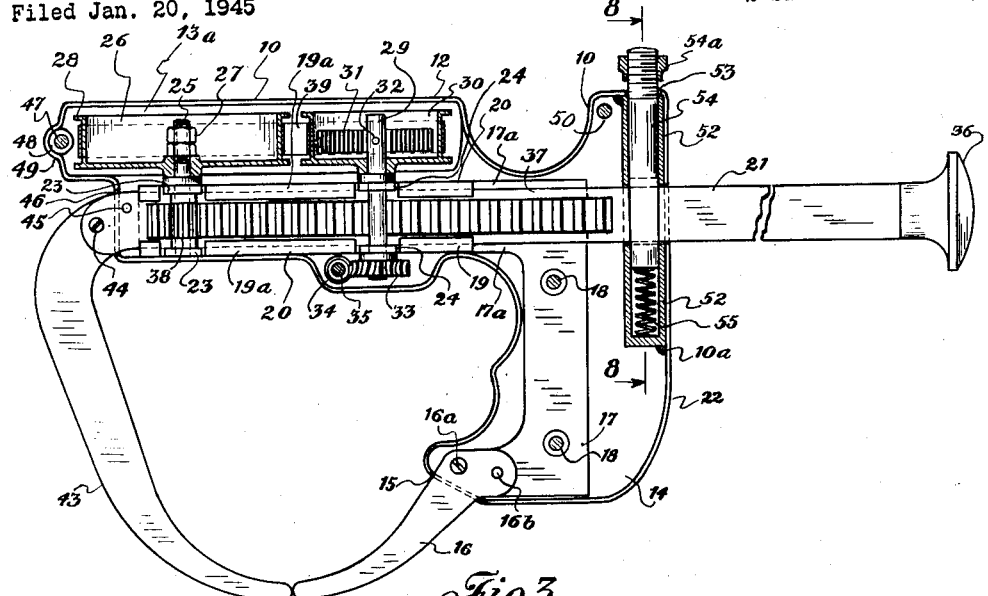
Fig. 3 is a partially cross sectional view taken on line 3—3 of Fig. 1.

Referring to the drawings, particularly Fig. 1, numerals 10 and 11 designate two relatively thin frame-like members, shells or casing sections preferably made of metal, plastic or other suitable material and which are symmetrical and when assembled together form a suitable elongated angular casing, housing, mounting means or frame on which other parts are adapted to be mounted or connected. Formed integral with corresponding edge portions of the casing sections 10 and 11 are rotor or drum casing sections 12 and 13, which have suitable integral edge flanges indicated, and said drum casing sections, when in adjacent and assembled position, define an oval as indicated in Fig. 1.

As illustrated, the casing portion or sections 12 and 13 are disposed at substantially right angles to the walls of casing sections 10 and 11 respectively and are of a size to conveniently house or inclose drums, rotors or spools as more particularly hereinafter described.

Reference numeral 14 designates a transversely extending compartment within the extending convenient grippable portion or handle 22 of the casing, a portion of which is illustrated in Fig. 3, and in which Fig. 3, the forward shell or casing section 11 is removed to show the interior parts and construction. Said handle 22 terminates in an opening or slot 15 as shown in Fig. 3 through which a portion of the stationary jaw or finger 16 extends. Said stationary jaw 16 may be formed either integral with or separately from the mounting plate or angular frame 17. In Figs. 2 and 3 the jaw 16 is illustrated as being a separable curved member suitably secured by a connecting pin and screw 16—a and 16—b.

Said mounting plate 17 is suitably secured within said casing by a plurality of screws or rivets 18, two of which are illustrated in Fig. 3. The innermost end portion 17—a of said mounting plate 17 extends transversely and at substantially right angles to the main body thereof and the integral edge portions of said plate section 17—a are bent at right angles to the plane of the main body of said plate 17 and also carry integral inwardly turned flanges 19 and 19—a which extend toward each other in a plane substantially parallel to the said plate 17 and its end section 17—a to thereby form a tunnel-like guide member designated generally as 20. The guide member 20 is of such size and shape as to provide for convenient slidable mounting of the depressible plunger or rack bar 21 hereinafter described.

A pair of integral apertured journalling ears 24 are provided by bending at right angles short sections of the opposite edge portions of guide 20 which are between guide flanges 19 and 19—a shown in Fig. 3. Similar integral apertured journalling ears 23 are bent transversely and formed adjacent the forward end of flanges 19—a as shown in Fig. 3.

Numeral 25 designates a shaft or spindle which is journalled in the aligned apertures of ears 23 and one threaded end of said shaft 25 extends into the drum compartment 13—a. Securely mounted on said extended portion of said shaft 25 is a reel, rotor or drum 26 whose hub portion is secured on said shaft by a pair of opposed lock nuts 27. Said reel or drum preferably has a pair of integral annular peripheral flanges 28 which guide and retain the flexible tape thereon. Said lock nuts 27 are adapted to be released and allowed to remain loose when it is desired to set the indicia bearing tape into zero or starting position with relation to the indicator 42 (Fig. 2).

Journalled in the aligned apertures of mounting ears 24 is a spindle or shaft 29, both of whose ends extend substantially beyond said ears as indicated in Fig. 3. On that end portion of the shaft 29 which extends into the drum compartment 13—a is securely mounted a relatively smaller drum, reel or spool 30 having its hub suitably journalled on said shaft as shown in Fig. 3.

A spiral spring 31 is housed within said reel 30 and has one end anchored to the peripheral flange of said reel and its other end connected to shaft 29 by anchoring pin 32.

The opposite end of said shaft 29 has securely mounted thereon a spiral gear wheel 33 whose teeth are in mesh with a pinion 34 secured on transversely extending shaft 35 which is journalled in a suitable aperture in the edge portion of the casing section 11 and whose slotted head is shown in elevation in Fig. 2. Said adjusting shaft 35, pinion 34 and gear 33 provide an easily adjustable means for adjusting the tension of spring 31 as well as the "starting" or normal position of said spring and this also thereby adjusts the spring impelled return movement of the movable jaw to the desired degree. The manual adjusting of the shaft 35 and thereby adjusting the "starting" or normal inactive position of the spring 31 simultaneously adjusts and sets the position of the indicia bearing tape (because reel 26 will have been loosened by release of nuts 27), this thereby enabling the manufacturer or the user to set the tape to zero position in relation to indicator 42 because the spring draws the reel and tape in one direction.

Either secured on or formed integral with plunger or rod 21 is a toothed rack or rack teeth 37 as indicated in Fig. 3. Said rack teeth 37 are in mesh with pinion 38 secured on spindle or shaft 25, so that longitudinal movement of said rack bar 21 rotates pinion 38, shaft 25 and reel 26. A tape 39, having measurement markings in small fractions (for example by .0025 of an inch) together with imprinted measurement indicia, is mounted on reel or drum 26 with one end suitably anchored to its peripheral surface. Said tape 39 extends to and rides on the reel 30 to which its opposite end is suitably secured in proper position.

The drum casing portion 13 is provided with a suitable opening, slot or window 41 as shown in Fig. 2, through which the reading on the tape is viewed and ascertained with the aid of a pointer 42 (see Fig. 2), secured on casing section 13.

The rack bar 21 carries on its projecting end portion a curved movable jaw 43 which may be formed integral with said rack bar, or if made separately, it may be secured by screw 44 and pin 45 as illustrated in Fig. 3. The said rack bar extends through and is movable in an opening 46 of the casing as shown at the left of Fig. 3.

The drum enclosing sections 12 and 13 of the casing are removably secured together by screw 47 which extends through aligned apertures 48 in bosses 49 of the two casing sections, as shown in Figs. 1, 2 and 3. Screw 50 mounted in aligned holes in the corner portion (shown at upper right of Fig. 3) and screw 51, removably secure said casing sections 10 and 11 together.

I will now describe one illustrative form of releasable locking means for selectively locking the plunger or rack bar and jaws in any desired position to which it may be moved. As shown in Fig. 3, a cylinder or sleeve 52 is secured by welding or the like adjacent the inside surface of the end wall 10—a of casing section 10 and with its open end in register with opening 53 in the corner portion of said casing section.

Figure 8:
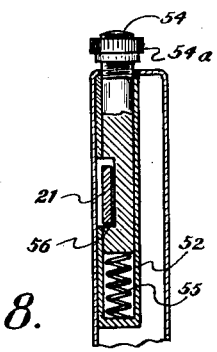
Fig. 8 is a fragmentary cross section taken on line 8—8 of Fig. 3.

A depressible locking pin 54 is slidably mounted in said cylinder and expansion spring 55 is mounted in said cylinder below said pin so as to return it to outer position when released. The intermediate portion of said pin is recessed over a distance slightly greater than the width of rack bar 21, as illustrated in Fig. 8 to thereby form an end surface 56 at the end of said recess which is normally pressed by spring 55 into frictional engagement with one surface of said rack bar.

As illustrated in Figs. 1 and 3, the upper end portion of the locking pin 54 may be externally threaded and have mounted thereon an optional adjustable locking nut 54a. When it is desired to lock the rack bar 21, and consequently the movable jaw in a given position for a temporary period, the user may tighten the threaded screw 54a so as to exert greater frictional and locking engagement between the end surface of the recess of pin 54 and the edge surface of the rack bar 21, as shown also in the enlarged view of Fig. 8.

When the user desires to project the movable jaw from normally closed position, he will, after gripping the handle portion 22 of the casing depress the projecting end portion of pin 54 to thereby release said rack bar for slidable movement, and thereupon either with the palm of his hand or with his thumb he will press against head or handle 36 of rack bar 21 to separate said jaws 16 and 43, and after positioning the jaws about the work, the user will release the head 36 and the action of spiral spring 31 will return the movable jaw and rack bar to contact of the end portions of the jaws on the desired parts of the work. The said return, closing or retracting movement imparted by spring 31 is transmitted through the tape, through reel 26, through pinion 38 and to said rack bar and movable jaw. After contact of the jaws on the work as desired, the user will release locking pin 54 and spring 55 will act to hold the rack bar, jaws and other movable parts in the set position until again manually released by release of said locking pin.

Another convenient and quick operation of using the said caliper or micrometer is to grip the handle 22 with the right hand, and depress the locking pin 54 with the first fore-finger and thence press against the head 36 with the thumb, to thereupon open the jaws, and upon positioning the jaws about the work releasing the plunger and permitting spring 31 to return the movable jaw into contact with the work. Thereupon locking pin 54 is released to releasably lock the rack bar and jaw in the set position according to the work dimension, which is viewable through the window 41, this position being temporarily retained particularly when transferring the dimension to another object.

Figure 4:
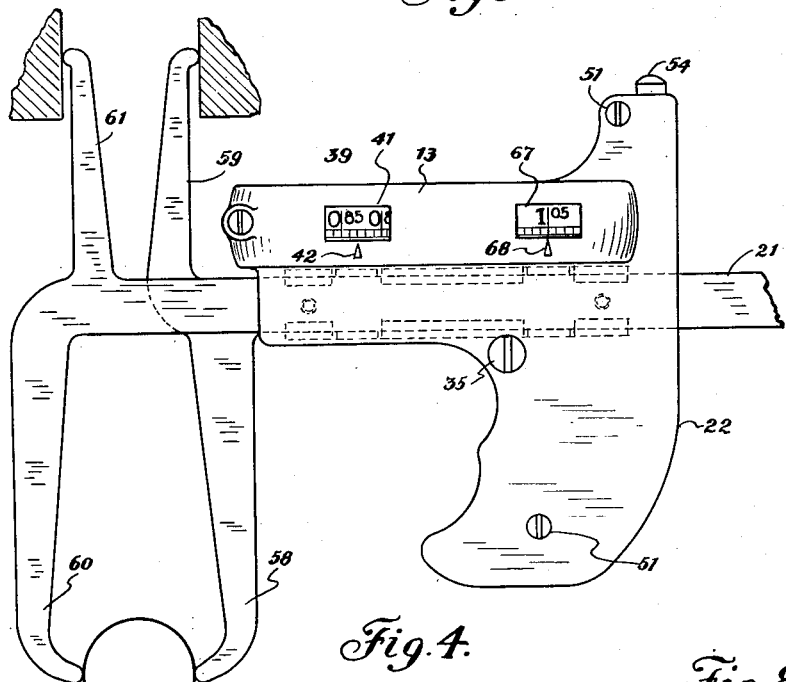
Fig. 4 is a front elevational view of a slightly modified form of my invention including two pairs of cooperating jaws.

In Fig. 4 I have illustrated the same caliper or micrometer instrument and containing the same operative mechanism, though having two pairs of jaws for both inside or outside dimension measurements.

Numeral 58 represents the outer portion of an outside dimension stationary jaw, and numeral 59 and oppositely extending outwardly turned jaw for inside dimension measurements, both of which stationary jaws are carried by the stationary portion thereof secured to the one housing section 10. Numerals 60 and 61 represent oppositely extending and oppositely curved jaws which are carried by movable rack bar 21 in the manner previously described. Jaw 61 cooperates with jaw 59 for inside dimension measurement, whereas jaws 58 and 60 are adapted for outside dimension measurement as illustrated. This novel device permits use of the same micrometer or caliper for all dimension work of a wide range of measurement.

Inasmuch as the distance between the contact surfaces of the inside measurement jaws 61 and 59 is different than the distance between the work contact surface of the outside dimension jaws 58 and 60, I provide a second viewing window or opening 67 in the rotor-enclosing casing sections 12 and 13 and an adjacent pointer 68 which will indicate the proper distances between inside dimension jaws 61 and 59. This construction permits the same graduated tape to be used for both sets of jaws, the user making the reading on whichever window and pointer applies to the jaws being used.

Figure 7:
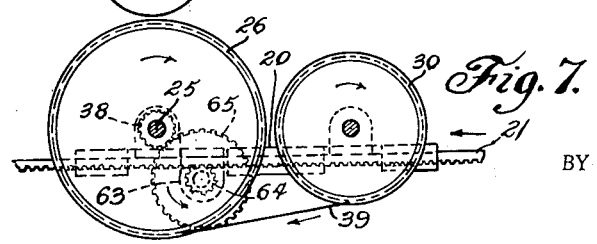
Fig. 7 is a partially cross section and partially diagrammatic view illustrating a modified form of pinion and gear movement transmission means.

Referring to Fig. 7, I therein illustrate in a fragmentary view a mechanism for increasing the ratio of movement from the slidable rack bar 21 to the rotor or reel 26, and so that a given movement of the rack bar will be multiplied many times in relation to the distance of movement of the tape which may in such instance carry very small and a greater number of graduations and measurement indicia, as for example to indicate thousandths of an inch.

Numeral 63 designates a pair of downwardly extending apertured ears or extensions either integral with or connected to the guide member 20. The pinion 64 is journalled in said ears 63 and the same meshes with the rack bar teeth. One end of pinion 64 is secured concentrically to larger gear 65, which gear 65 in turn meshes with pinion 38 on the spindle or shaft 25 on whose projecting end portion rotor or reel 26 is secured. It will be understood that the ratio of said gear and pinion will result in increased speed of rotation of shaft 25, rolls 26 and 30 and the tape 39 so as to provide for use of a longer tape with a greater number of graduations thereon which will indicate very small fractions of a measurement unit.

In the use of my invention, the user may conveniently grip the handle 22 of the casing in the palm of his hand, placing the first forefinger upon the projecting end of the slidable plunger or locking element 54 and depressing the same. Thereupon the handle or finger piece 36 is depressed with the thumb and the movable jaw moved to permit placing of the jaws on opposite sides of the work. Thereupon the thumb pressure on handle 36 and rack bar 21 is released until the jaws contact the work surfaces at the desired points, the return movement of the movable jaw and rack bar being imparted by the tension of spring 31 transmitted through the tape, reel 26 and pinion 38. The contact of the jaws stop the return movement of the tape and the reading is taken through the window 41 and at pointer 42. To release the work, the thumb is slightly depressed and the work and jaws separated.

I am aware that various changes may be made

I claim:

1. In combination with an indicator mechanism having a pair of rotatable drums and having an indicia bearing tape connected thereto, means for adjusting the zeroizing of said indicia bearing tape comprising a shaft extending into one of said drums; an adjustable locking mechanism for releasably securing said last mentioned drum to said shaft; a second shaft journalled in the second of said drums; a spring connecting said second shaft and said second drum; a gear wheel secured on an end of said second shaft; a pinion in mesh with said gear wheel, and a third shaft rigidly connected to said pinion, the adjustment of said third shaft being adapted to change the tension on said spring, the release of said adjustable locking mechanism being adapted to permit adjustment of said tape with respect to said first shaft.

2. In a micrometer caliper having a stationary jaw, a movable jaw, a movable plunger having said movable jaw connected thereto for moving said movable jaw toward and away from said stationary jaw, a toothed rack connected to said plunger, and having a pair of rotatable drums; means operatively connecting the first of said drums and said rack whereby said first drum is adapted to be rotated by the movement of said rack, an extensible indicia bearing tape connected to said drums, an adjusting spring connected to the second of said drums, and having means for adjusting the tension on said spring and for adjusting said tape to the zero point, said last means comprising, a shaft, said first drum being mounted on said shaft; a pair of lock nuts for adjustably securing said shaft to said first drum; a second shaft journalled in said second drum; a gear rigidly connected to said second shaft; a second gear in mesh with said first gear, and means for manually rotating said second gear, the rotation of said second gear being adapted to adjust the tension on said spring when said lock nuts are in locked position and being adapted to adjust said tape when said lock nuts are in open positions.

3. In a micro-caliper instrument having a frame, a stationary jaw, a guide member, a toothed rack bar slidable in said guide member and a movable jaw connected to said rack bar and movable therewith, a pair of reels operatively connected to said rack bar, a graduated tape rollable on and connected to said reels, spring means connected to one of said reels and being adapted to return said tape and said rack bark to starting position, and having manually movable means carried by said frame and operatively connected to said reels for adjusting the normal positions of said reels and the graduated tape thereon, said last mentioned means comprising a shaft journalled in one of said reels, said spring means having one of its ends stationarily anchored to said last mentioned reel; a gear fixed to said shaft; a pinion in mesh with said gear; an adjusting means for rotating said pinion to thereby rotate said shaft; a second shaft for the second of said reels; a second gear carried by said second shaft and in mesh with said toothed rack bar; a locking means on said second shaft for releasably securing same to said second reel, the release of said locking means being adapted to permit adjustment of said tape with respect to said toothed rack bar and said movable jaw.

FRANCIS TVRZICKY.

REFERENCES CITED

The following references are of record in the file of this patent:

UNITED STATES PATENTS

| Number | Name | Date |
|---|---|---|
| 1,422,576 | Humphreys | July 11, 1922 |
| 1,661,214 | Carpenter | Mar. 6, 1928 |
| 1,926,452 | Norling | Sept. 12, 1933 |
| 2,231,609 | Anderson | Feb. 11, 1941 |
| 2,303,858 | Ostberg | Dec. 1, 1942 |

FOREIGN PATENTS

| Number | Country | Date |
|---|---|---|
| 28,727 | Great Britain | Dec. 20, 1911 |
| 50,426 | Norway | Aug. 14, 1933 |